Patented Apr. 29, 1947

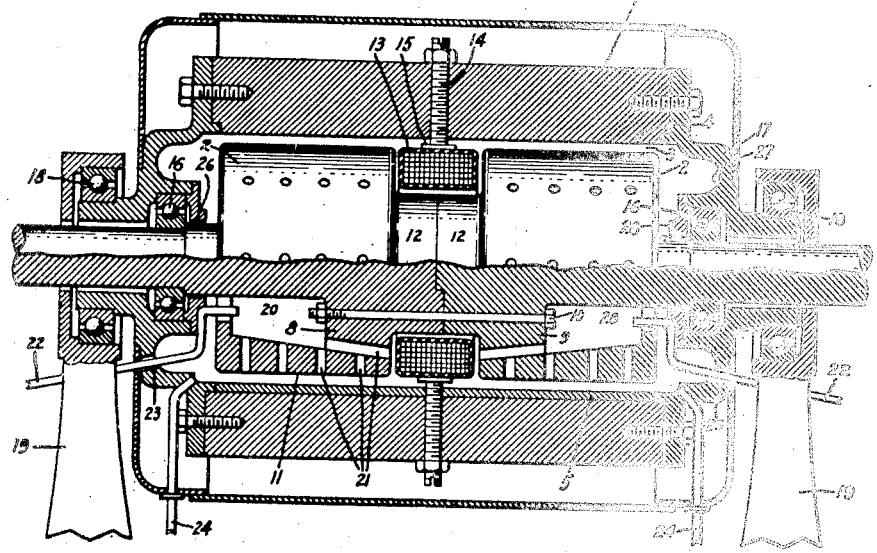

2,419,837

UNITED STATES PATENT OFFICE 2,419,837

DYNAMOELECTRIC MACHINE

Adolph C. Hugin, Schenectady, N. Y., assignor to General Electric Company, a corporation of New York Application October 16, 1944, Serial No. 558,806

13 Claims. (Cl. 188—104)

My invention relates to dynamoelectric machines and more particularly to the inductor eddy current type machines which are particularly adaptable to be used as dynamometers, clutches, or brakes.

An object of my invention is to provide an improved eddy current inductor type dynamoelectric machine.

Another object of my invention is to provide an improved dynamoelectric machine of the inductor type in which cooling fluid is supplied directly to the air gap between the two relatively rotatable members of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly in section, showing an embodiment of my invention; Fig. 2 is a partial sectional view through the outer member core of a machine such as that shown in Fig. 1; Fig. 3 is a partial side elevational view, partly in section, of a dynamoelectric machine similar to that shown in Fig. 1 illustrating another modification of my invention; and Fig. 4 is an enlarged sectional view of the toothed core of the outer member of a machine such as that shown in Figs. 1 and 3.

Referring to the drawing, I have shown in Fig. 1 an embodiment of my invention in which the dynamoelectric machine is adapted to be used as an absorption dynamometer. In this construction, the machine is provided with two relatively rotatable members, one of which is arranged as an outer member 1 extending around the other relatively rotatable member 2, which is arranged as an inner member. Both of these relatively rotatable members are provided with longitudinally extending cores of magnetic material arranged adjacent each other with an air gap 3 therebetween. The core of the outer member is formed with a toothed portion having circumferentially spaced apart longitudinally extending teeth 4 which extend substantially the full axial length thereof adjacent the surface of the inner member. These teeth may be formed with parallel sides, such that the intertooth space is narrower at its inner periphery than adjacent the base of the teeth, and this space may be filled with a non-magnetic material to provide fillers 5 which are retained in position by the wedge shape of the space between the teeth, since the base of the filler element is larger than the outer ends thereof, as shown in Fig. 2. In some instances, it may be found desirable to form the teeth of the toothed portion narrower at the outer ends of the teeth than at the base of the teeth, as shown in Fig. 4, and it has been found that if the width of the outer ends of the teeth is substantially one-third the total pitch of the teeth, a maximum efficiency of the magnetic tooth construction is obtainable. With such a construction, the inter-tooth fillers may be made of non-magnetic material cast about roughened inserts or threaded studs 6, such that the insert elements 7 are held in position after being cast between the teeth by these roughened inserts 6. This provides the necessary anchoring for the filler elements 7, and the number of inserts 6 may be varied according to the use to which the machine is to be placed. If the machine is to be used as a dynamometer, relatively small forces will be exerted upon the filler elements 7, and it is not necessary to provide very many anchoring inserts 6; whereas if the machine is to be used as a clutch, the rotating forces may tend to dislocate the filler elements 7 and it may be found desirable to add more of the anchoring inserts 6. In this case, however, if the toothed member is made as the outer member, as shown in Fig. 1, centrifugal force will tend to bias the filler elements 7 outwardly and to maintain these elements in position in the inter-tooth spaces rather than to tend to throw these elements out from between the teeth. Thus, it is seen that in any case, the forces on the filler elements 7 will be relatively small when the toothed member is made as the outer member of the machine. The inner member 2 is preferably formed of two complementary sections 8 and 9 which are adapted to be secured together by a plurality of through bolts 10 or other suitable fastening means and are formed with substantially smooth cylindrical surfaces 11 adjacent the toothed outer member, providing an air gap therebetween, and includes a portion of reduced diameter 12 which provides an annular recess in the core intermediate the ends thereof. Excitation is provided to the machine by a field exciting winding 13 which is arranged in the annular recess with a clearance therearound such that the rotatable member 2 can turn within the winding 13 without mechanical interference or rubbing therewith, and the winding 13 is arranged in a water-proof enclosure held in position in any suitable manner, as by retaining screws 14 arranged in engagement with retaining clamping plates 15 which engage the outer side of the insulating enclosure of the winding and center it relative to the axis of the inner rotatable member 2. When the field exciting winding 13 is energized and the inner member 2 is rotated, eddy currents are induced in the smooth cylindrical surfaces of the member 2 which tend to heat up this element and absorb the energy transmitted thereto from an external source. An equal and opposite torque reaction is transmitted to the outer relatively rotatable member 1 through the toothed core portion 4, and this outer member is adapted to be secured to any suitable torque measuring means as is conventionally used with this type dynamometer.

In order to increase the efficiency and capacity of the machine, it is desirable to provide for a forced cooling of the eddy current inner member 1 in order to remove the heat generated therein by the eddy currents. In the construction shown in Fig. 1, the inner member 2 is rotatably supported by antifriction ball bearings 16 which are mounted in end shields 17 of the outer member 1, and the outer member 1 is rotatably supported by antifriction ball bearings 18 which are mounted in pedestals 19. The inner member 2 is formed with an annular recess 20 on the interior of each end of the member and is provided with a plurality of axially and circumferentially spaced apart passages 21 extending outwardly from the interior of the annular recesses 20 through the inner member core to the exterior thereof for providing for the passage of cooling fluid, such as water, therethrough to the air gap 3 under the action of centrifugal force when the inner member 2 is rotated. Cooling fluid is supplied to the interior annular recesses 20 by any suitable means, such as a supply pipe 22, which is mounted in the pedestals 19 and which extends through elongated slots 23 in the end shields 17 to prevent interference with the rotation of the outer member 1 for a limited amount of rotational movement. With such an arrangement, the cooling fluid is supplied to the annular recesses 20 and is sprayed outwardly by centrifugal force through the passages 21 into the air gap and around the exciting winding 13, thereby cooling the exciting winding 13 and cooling the eddy current member 2 by passages through this member and by contact with the outer eddy current surfaces adjacent the air gap 3. This cooling fluid then passes through the air gap in both directions towards the ends of the machine and is adapted to be drained from the machine by exhaust pipes 24 which extend through the outer member end shields 17 to the space adjacent the air gap. In some instances, it may be found desirable to provide an axially outward force towards the ends of the machine on the cooling fluid moving from the passages of the inner member in order to assure a minimum of interference between the cooling fluid entering the air gap from the two sides of the machine. This result may be obtained by providing the inner member 2 with a plurality of outwardly extending passages 25 on each side of the field exciting winding annular recess, which extend outwardly at an angle with the outer ends thereof nearer the adjacent end of the core than the inner ends thereof, as shown in Fig. 3. The remainder of this machine may be made substantially the same as that shown in Fig. 1, and the corresponding parts of the machine are numbered the same as those in the other figures of this drawing. In this type machine, the cooling fluid tends to be splashed to a certain extent within the machine and, therefore, a labyrinth seal 26 is arranged adjacent the inner side of each ball bearing 16 to exclude cooling fluid from the bearing compartments. In addition, the outer member end shields 17 are formed with annular recesses 27 in order further to collect cooling fluid which might come in contact with the end shield and to direct this cooling fluid towards the exhaust pipes 24. If the cooling fluid used is water or a similar substance, the surfaces of the machine which come in contact with the cooling fluid are apt to become corroded. It may be found desirable to provide a rust-proofing coating or plating over the surfaces of the machine which normally come in contact with the cooling fluid. It may even be found desirable in the case of the inner member to impregnate the outer cylindrical surfaces thereof with a rust-proofing metal, such as copper, by any conventional method which is known in the art. This will eliminate the tendency of the rust-proofing material to peel, as might result from a plated or otherwise applied layer of rust-proofing material. Furthermore, such an impregnated surface will have the properties of the impregnating material, and by using a high electrical conductivity material, it will further enhance the properties of the machine by providing a lower resistance eddy current surface to the eddy current member without the use of a separate layer or insert of the low resistance material, and will provide a substantially integral anchoring of the impregnating metal with the magnetic material of the core of the member 2. With such a construction, the hydraulic drag or load on the machine will be maintained at a minimum, as the cooling fluid will pass substantially only between relatively smooth cylindrical surfaces, and a minimum of churning will result. It may be found desirable in some instances to omit the non-magnetic filler elements between the teeth 4 in order to simplify the construction of the machine and also in order to provide for the passage of a larger amount of cooling fluid between the two relatively rotatable members 1 and 2.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine including outer and inner relatively rotatable members with cores of magnetic material, means for rotatably supporting each of said relatively rotatable members, one of said members having a toothed portion with teeth each extending adjacent the adjacent surface of the other of said members, means including non-magnetic material fillers in the spaces between said teeth for providing a substantially smooth cylindrical surface adjacent said other member, said other member having a substantially smooth cylindrical surface adjacent said toothed member and providing an air gap therebetween, means for magnetically exciting said cores of said members, means for supplying cooling fluid to said air gap, means for exhausting said cooling fluid from said machine, and means including a low electrical resistance material impregnated into the substantially smooth cylindrical surface of said other member for rust-proofing said surface.

2. A dynamoelectric machine including outer and inner relatively rotatable members with cores of magnetic material, means for rotatably supporting each of said relatively rotatable members, said outer member having a toothed portion with teeth each extending substantially the full axial length thereof adjacent the adjacent surface of said inner member, said teeth being substantially narrower at the air gap ends than at the bases thereof, said inner member having a substantially smooth cylindrical surface adjacent said toothed outer member and providing an air gap therebetween, means including a field exciting winding for magnetically exciting said inner and outer member cores, means including a plurality of axially and circumferentially spaced apart passages extending outwardly through said inner member core to the exterior thereof for providing for the passage of cooling fluid therethrough to said air gap, means for supplying cooling fluid to said outwardly extending passages, and means for exhausting said cooling fluid from said outer member adjacent said air gap.

3. A dynamoelectric machine including outer and inner relatively rotatable members with cores of magnetic material, means for rotatably supporting each of said relatively rotatable members, said outer member having a toothed portion with teeth each extending substantially the full axial length thereof adjacent the adjacent surface of said inner member, each of said teeth having an air gap width substantially one-third tooth pitch and having a wider base, said inner member having a substantially smooth cylindrical surface adjacent said toothed outer member and providing an air gap therebetween, means for magnetically exciting said inner and outer member cores, means including a plurality of axially and circumferentially spaced apart passages extending outwardly through said inner member core to the exterior thereof for providing for the passage of cooling fluid therethrough to said air gap, means for supplying cooling fluid to said outwardly extending passages, means for exhausting said cooling fluid from said outer member, and a rustproofing means over the surfaces of said outer and inner members which come in contact with said cooling fluid.

4. A dynamoelectric machine including outer and inner relatively rotatable members, means for rotatably supporting each of said relatively rotatable members, said outer member having a longitudinally extending core of magnetic material with a toothed portion having teeth adjacent the adjacent surface of said inner member with the air gap width of each tooth substantially equal to one-third tooth pitch and narrower than the base thereof, said inner member being formed with a core of magnetic material having substantially a smooth cylindrical surface adjacent said toothed outer member and providing an air gap therebetween, means including a relatively high conductivity material impregnated into said inner member cylindrical surface for rust-proofing said surface, means including a field exciting winding for magnetically exciting said inner and outer members, means including a plurality of axially and circumferentially spaced apart passages extending outwardly through said inner member core to the exterior thereof for providing for the passage of cooling fluid therethrough to said air gap, means for supplying cooling fluid to said outwardly extending passages, and means for exhausting said cooling fluid from said outer member.

5. A dynamoelectric machine including outer and inner relatively rotatable members with cores of magnetic material, means for rotatably supporting each of said relatively rotatable members, said outer member having a toothed portion with teeth each extending substantially the full axial length thereof adjacent the adjacent surface of said inner member, said teeth being substantially narrower at the air gap ends than at the bases thereof, said inner member having a substantially smooth cylindrical surface adjacent said toothed outer member and providing an air gap therebetween, means for magnetically exciting said inner and outer member cores, means including a plurality of axially and circumferentially spaced apart passages extending outwardly through said inner member core to the exterior thereof for providing for the passage of cooling fluid therethrough to said air gap, means for supplying cooling fluid to said outwardly extending passages, means for exhausting said cooling fluid from said outer member, and a low electrical resistance material impregnated into the substantially smooth cylindrical surface of said inner member for rust-proofing said surface.

6. A dynamoelectric machine including outer and inner relatively rotatable members, means for rotatably supporting each of said relatively rotatable members, said outer member having a longitudinally extending core of magnetic material with a toothed portion having teeth adjacent the adjacent surface of said inner member, said inner member being formed with a core of magnetic material having substantially smooth cylindrical surfaces adjacent said toothed outer member and providing an air gap therebetween with an annular recess in said core intermediate the ends thereof, means including a field exciting winding arranged in said annular recess for magnetically exciting said inner and outer members, means including a plurality of axially and circumferentially spaced apart passages extending outwardly through said inner member core to the exterior thereof for providing for the passage of cooling fluid therethrough to said air gap, means for supplying cooling fluid to said outwardly extending passages, and means for exhausting said cooling fluid from said outer member.

7. A dynamoelectric machine including outer and inner relatively rotatable members with cores of magnetic material, means for rotatably supporting each of said relatively rotatable members, said outer member having a toothed portion with teeth each extending substantially the full axial length thereof adjacent the adjacent surface of said inner member, means including non-magnetic material fillers arranged in the space between said teeth for providing a substantially smooth cylindrical surface adjacent said inner member, said inner member having a substantially smooth cylindrical surface adjacent said toothed outer member and providing an air gap therebetween, means for magnetically exciting said inner and outer member cores, means including a plurality of axially and circumferentially spaced apart passages extending outwardly through said inner member core to the exterior thereof for providing for the passage of cooling fluid therethrough to said air gap, means for supplying cooling fluid to said outwardly extending passages, and means for exhausting said cooling fluid from said outer member.

8. A dynamoelectric machine including outer and inner relatively rotatable members, means for rotatably supporting each of said relatively rotatable members, said outer member having a longitudinally extending core of magnetic material with a toothed portion having teeth adjacent the adjacent surface of said inner member, means including non-magnetic material fillers arranged in the space between said teeth and secured to said core for providing a substantially smooth cylindrical surface adjacent said inner member, said inner member being formed with a core of magnetic material having substantially smooth cylindrical surfaces adjacent said toothed outer member and providing an air gap therebetween with an annular recess in said core intermediate the ends thereof, means including a field exciting winding arranged in said annular recess for magnetically exciting said inner and outer members, means including a plurality of axially and circumferentially spaced apart passages extending outwardly through said inner member core to the exterior thereof for providing for the passage of cooling fluid therethrough to said air gap, means for supplying cooling fluid to said outwardly extending passages, and means for exhausting said cooling fluid from said outer member adjacent said air gap.

9. A dynamoelectric machine including outer and inner relatively rotatable members, means for rotatably supporting each of said relatively rotatable members, said outer member having a longitudinally extending core of magnetic material with a toothed portion having teeth adjacent the adjacent surface of said inner member, means including non-magnetic material fillers arranged in the space between said teeth and secured to said core for providing a substantially smooth cylindrical surface adjacent said inner member, said inner member being formed with a core of magnetic material having substantially smooth cylindrical surfaces adjacent said toothed outer member and providing an air gap therebetween with an annular recess in said core intermediate the ends thereof, means including a relatively high conductivity material impregnated into said inner member cylindrical surfaces for rust-proofing said surfaces, means including a field exciting winding arranged in said annular recess for magnetically exciting said inner and outer members, means including a plurality of axially and circumferentially spaced apart passages extending outwardly through said inner member core to the exterior thereof for providing for the passage of cooling fluid therethrough to said air gap, means for supplying cooling fluid to said outwardly extending passages, and means for exhausting said cooling fluid from said outer member adjacent said air gap.

10. A dynamoelectric machine including outer and inner relatively rotatable members, means for rotatably supporting each of said relatively rotatable members, said outer member having a longitudinally extending core of magnetic material with a toothed portion having teeth adjacent the adjacent surface of said inner member, said inner member being formed with a core of magnetic material having substantially smooth cylindrical surfaces adjacent said toothed outer member and providing an air gap therebetween with an annular recess in said core intermediate the ends thereof, means including a field exciting winding arranged in said annular recess for magnetically exciting said inner and outer members, means including a plurality of axially and circumferentially spaced apart passages extending outwardly through said inner member core to the exterior thereof for providing for the passage of cooling fluid therethrough to said air gap, said passages being arranged on each side of said field exciting winding annular recess and extending outwardly at an angle with the outer ends thereof nearer the adjacent end of said core than the inner ends thereof to provide an axially outward force toward each end of the machine on the cooling fluid passing from said passages under the action of centrifugal force, and means for exhausting said cooling fluid from said outer member.

11. A dynamoelectric machine including two relatively rotatable members, means for rotatably supporting each of said relatively rotatable members, one of said relatively rotatable members being arranged as an outer member extending around the other of said relatively rotatable members arranged as an inner member, said outer member having a longitudinally extending core of magnetic material with a toothed portion having teeth each extending substantially the full axial length thereof adjacent the adjacent surface of said inner member, means including non-magnetic material fillers arranged in the space between said teeth and secured to said core for providing a substantially smooth cylindrical surface adjacent said inner member, said inner member being formed with a core of magnetic material having substantially smooth cylindrical surfaces adjacent said toothed outer member and providing an air gap therebetween with an annular recess in said core intermediate the ends thereof, means including a field exciting winding arranged in said annular recess for magnetically exciting said inner and outer members, means including an annular recess on the interior of each end of said inner member and a plurality of axially and circumferentially spaced apart passages extending outwardly from said interior annular recess through said core to the exterior thereof for providing for the passage of cooling fluid therethrough to said air gap under the action of centrifugal force, means for supplying cooling fluid to said interior annular recess, and means for exhausting said cooling fluid from said outer member.

12. A dynamoelectric machine including two relatively rotatable members, means for rotatably supporting each of said relatively rotatable members, one of said relatively rotatable members being arranged as an outer member extending around the other of said relatively rotatable members arranged as an inner member, said outer member having a longitudinally extending core of magnetic material with a toothed portion having teeth adjacent the adjacent surface of said inner member, means including non-magnetic material fillers arranged in the space between said teeth and secured to said core for providing a substantially smooth cylindrical surface adjacent said inner member, said inner member being formed with a core of magnetic material having substantially smooth cylindrical surfaces adjacent said toothed outer member and providing an air gap therebetween with an annular recess in said core intermediate the ends thereof, means including a field exciting winding arranged in said annular recess for magnetically exciting said inner and outer members, means including a plurality of axially and circumferentially spaced apart passages extending outwardly through said inner member core to the exterior thereof for providing for the passage of cooling fluid therethrough to said air gap, said passages being arranged on each side of said field exciting winding annular recess and extending outwardly at an angle with the outer ends thereof nearer the adjacent end of said core than the inner ends thereof to provide an axially outward force toward each end of the machine on the cooling fluid passing from said passages under the action of centrifugal force, means for supplying cooling fluid to said outwardly extending passages, and means for exhausting said cooling fluid from said outer member.

13. A dynamoelectric machine including two relatively rotatable members, means for rotatably supporting each of said relatively rotatable members, one of said relatively rotatable members being arranged as an outer member extending around the other of said relatively rotatable members arranged as an inner member, said outer member having a longitudinally extending core of magnetic material with a toothed portion having teeth adjacent the adjacent surface of said inner member, means including non-magnetic material fillers arranged in the space between said teeth and secured to said core for providing a substantially smooth cylindrical surface adjacent said inner member, said inner member being formed with a core of magnetic material having substantially smooth cylindrical surfaces adjacent said toothed outer member and providing an air gap therebetween with an annular recess in said core intermediate the ends thereof, means including a field exciting winding arranged in said annular recess for magnetically exciting said inner and outer members, means including an annular recess on the interior of each end of said inner member and a plurality of axially and circumferentially spaced apart passages extending outwardly from said interior annular recess through said inner member core to the exterior thereof for providing for the passage of cooling fluid therethrough to said air gap, said passages being arranged on each side of said field exciting winding annular recess and extending outwardly at an angle with the outer ends thereof nearer the adjacent end of said core than the inner ends thereof to provide an axially outward force toward each end of the machine on the cooling fluid passing from said passages under the action of centrifugal force, means for supplying cooling fluid to said outwardly extending passages, and means for exhausting said cooling fluid from said outer member.

ADOLPH C. HUGIN.

REFERENCES CITED

The following references are of record in the file of this patent:

UNITED STATES PATENTS

| Number | Name | Date |
| --- | --- | --- |
| 1,954,809 | Fraser | Apr. 17, 1934 |
| 2,367,636 | Winther | Jan. 16, 1945 |
| 1,382,694 | Towar | June 28, 1921 |
| 2,286,008 | Pfalzgraff | June 9, 1942 |
| 2,004,866 | Haldeman | June 11, 1935 |
| 1,691,696 | Baum | Nov. 13, 1928 |
| 1,101,997 | Church | June 30, 1914 |

FOREIGN PATENTS

| Number | Country | Date |
| --- | --- | --- |
| 363,082 | British | Dec. 17, 1931 |